(12) United States Patent
Zaluska et al.

(10) Patent No.: US 6,733,725 B2
(45) Date of Patent: May 11, 2004

(54) REVERSIBLE HYDROGEN STORAGE COMPOSITION

(75) Inventors: Alicja Zaluska, Montreal (CA); Leszek Zaluski, Montreal (CA); John Olaf Strom-Olsen, Montreal (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 09/820,835

(22) Filed: Mar. 30, 2001

(65) Prior Publication Data

US 2001/0018939 A1 Sep. 6, 2001

Related U.S. Application Data

(63) Continuation of application No. PCT/CA98/00947, filed on Oct. 7, 1998.

(51) Int. Cl.⁷ .................................................. C01B 6/24
(52) U.S. Cl. ....................... 420/528; 423/644; 423/646; 420/900; 420/552; 420/542
(58) Field of Search ................... 420/900, 542, 420/528, 552; 423/644–646, 658.2

(56) References Cited

U.S. PATENT DOCUMENTS 5,656,105 A   8/1997   Tanaka et al.
5,763,363 A   6/1998   Schulz et al.
6,106,801 A * 8/2000   Bogdanovic et al. .... 423/648.1

FOREIGN PATENT DOCUMENTS

DE   19 09 723    2/1970
DE   195 26 434   1/1997

OTHER PUBLICATIONS

Bogdanovic et al, "T1–doped alkali Metal Aluminium hydrides as Potential Novel Reversible Hydrogen Storage Materials" Journal of Alloys and Compounds, vol. 253–254, May 20, 1997, pp. 1–9.

* cited by examiner

*Primary Examiner*—Roy King
*Assistant Examiner*—Janelle Morillo
(74) *Attorney, Agent, or Firm*—Ogilvy Renault

(57) ABSTRACT

Hydrogen storage compositions which liberate hydrogen readily and which are readily regenerated from a dehydrogenated state formed by liberation of hydrogen are derived from an $AlH_3$-based complex hydride incorporating a member selected from a metalloid such as B, C, Si, P and S, a metal such as Cr, Mn, Fe, Co, Ni, Cu, Mo, Zn, Ga, In and Sn, a metal which forms a stable hydride such as Be, Mg, Ca, Ti, V, Y, Zr and La and a second $AlH_3$-based complex hydride.

18 Claims, 4 Drawing Sheets

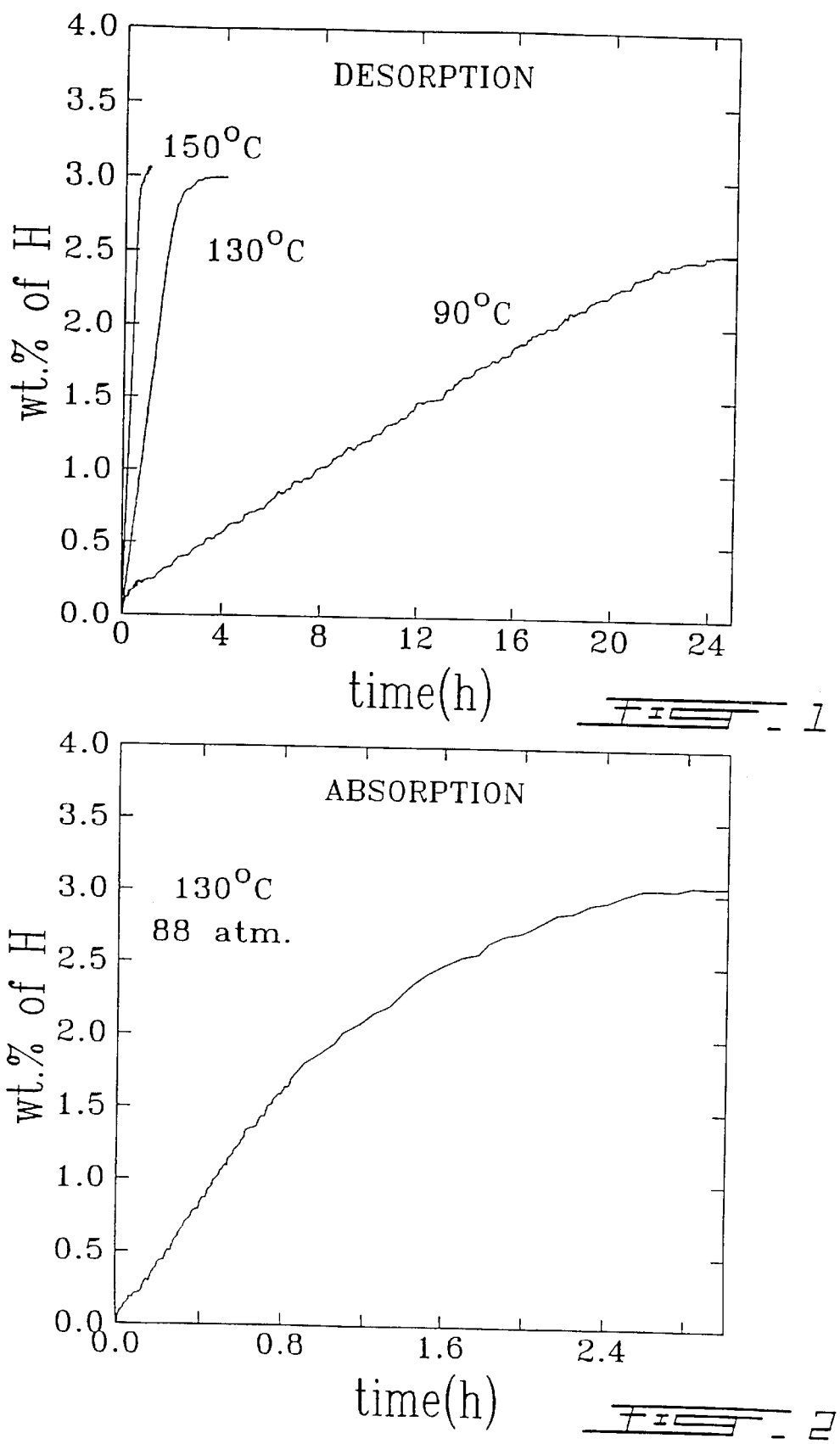

REVERSIBLE HYDROGEN STORAGE COMPOSITION

CROSS-REFERENCE TO RELATED APPLICATION

This Application is a Continuation of PCT/CA 98/00947, filed Oct. 7, 1998, in which the United States of America was designated and elected, and which remains pending in the International phase until Apr. 7, 2001.

TECHNICAL FIELD

This invention relates to a hydrogen storage composition and to a method of supplying hydrogen.

BACKGROUND ART

Amongst the known metal hydrides, only a few exhibit properties suitable for reversible hydrogen storage. Reversibility of hydrogen sorption by a metal hydride means the capability to absorb and desorb hydrogen under practical conditions of hydrogen pressure and temperature. Most hydrides are either too stable for hydrogenation cycling so that absorption is easy but desorption of hydrogen requires very high temperatures; or too unstable so that desorption occurs readily, but absorption requires extremely high hydrogen pressure.

Stable metal hydrides include such compounds as LiH, which melts at the temperature of 680° C. but decomposes at an even higher temperature of 720° C., $TiH_2$, $CaH_2$ and $ZrH_2$, which have to be heated up to 650° C., 600° C. and 880° C., respectively, in order to release hydrogen. Re-hydrogenation of these hydrides is, however, easy and they absorb hydrogen readily even under low hydrogen pressure.

From the group of unstable metal hydrides, $AlH_3$ and $LiAlH_4$ are the most characteristic examples, having such a high equilibrium pressure of hydrogen that gaseous hydrogenation is in practice impossible. Only chemical reactions are effective for the formation of these unstable hydrides. On the other hand, both $AlH_3$ and $LiAlH_4$ desorb hydrogen readily at temperatures between 100° C. and 130° C. and with good kinetics.

So far, the only materials which exhibit practical, reversible properties, i.e., hydrogenation/dehydrogenation at ambient conditions, for example, $LaNi_5$, FeTi or Ti—V, have a hydrogen capacity of less than 2 wt. %, which is too low for practical applications.

DISCLOSURE OF THE INVENTION

The invention provides hydrogen storage compositions capable of reversible operation at moderately elevated temperatures of 80–180° C., typically 100–150° C., and having a hydrogen capacity exceeding 2 wt. %.

In accordance with one aspect of the invention there is provided a reversible hydrogen storage composition having a hydrogen capacity exceeding 2 wt. % and capable of reversible operation at temperatures of 80–180° C. comprising i) an unstable $AlH_3$-based complex hydride alloyed by ball milling with: ii) at least one member selected from the group consisting of: a) an element that does not readily form a hydride in a solid-state form, b) a metal which forms a stable metal hydride, c) a hydride of a metal of b), and d) an unstable $AlH_3$ hydride complex different from said complex i), said unstable $AlH_3$-based complex hydrides i) and ii)d) liberating hydrogen readily at temperatures of 100 to 150° C.

In accordance with another aspect of the invention there is provided a composition of the invention in a dehydrogenated state.

In accordance with yet another aspect of the invention there is provided a method of supplying hydrogen comprising liberating hydrogen from a composition of the invention at a temperature of at least 80° C. with formation of a dehydrogenated form of the composition, removing the liberated hydrogen, and absorbing hydrogen in the dehydrogenated form to regenerate the $AlH_3$-based complex hydride as a future source of hydrogen.

In this specification reference to a "dehydrogenated form" or "dehydrogenated state" refers to a form or state of the hydrogen storage composition of the invention resulting from liberation of hydrogen from the composition. It is not intended to indicate that complete dehydrogenation has necessarily occurred, and contemplates both a complete dehydrogenation and a partial dehydrogenation resulting from liberation of at least part of the hydrogen content of the composition.

The reference to an $AlH_3$-based complex hydride refers to those complex metal hydrides such as $NaAlH_4$ or $LiAlH_4$ which liberate hydrogen readily at moderate temperatures of the order of 100 to 150° C., forming a dehydrogenated form or state from which the hydride form can not be regenerated with hydrogen gas, or which can only be regenerated under extreme conditions impractical in a reversible hydrogen storage composition. These $AlH_3$-based complex hydrides are sometimes referred to as being "unstable" in view of their ease in liberating hydrogen and the difficulty in regeneration from the dehydrogenated form.

DETAILED DISCLOSURE OF THE INVENTION

The invention is based on the discovery, that properties of these so-called unstable metal hydrides, which decompose easily but are very difficult to re-hydrogenate, can be altered in such a way that the required re-hydrogenation conditions are much more favourable and the hydride can be regenerated with hydrogen gas in a practical operation.

The alteration of the unstable metal hydride may be achieved by changing the chemical composition of the hydride, accompanied by mechanical grinding.

More especially the invention is concerned with hydrides based on $AlH_3$-complex. $AlH_3$ is very unstable and decomposes spontaneously at temperatures above 100° C. Normally, $AlH_3$ can not be rehydrogenated, even at extremely high hydrogen pressures, after hydrogen has been liberated from it. The same applies to other hydrides based on $AlH_3$ complex, for example, $LiAlH_4$, $NaAlH_4$, $Mg(AlH_4)_2$ and $Ca(AlH_4)_2$. These hydrides offer very high hydrogen capacities, typically up to 7-wt. %, and desorb hydrogen easily at temperatures between 100° C. and 180° C., but normally can not be rehydrogenated at hydrogen pressures lower than 100 atmospheres.

In this invention, properties of such unstable hydrides are changed by incorporating in them other elements or hydrides, typically the incorporation may be by alloying the components together by, for example, mechanical grinding or ball milling.

A large variety of unstable $AlH_3$-based hydrides have been investigated with different alloying components, and such alloying is found to produce dramatic change in the hydrogenation properties of the $AlH_3$-based hydrides. As a consequence, the hydrides become reversible for practical applications because rehydrogenation can be performed at much lower hydrogen pressures.

Typical $AlH_3$-based complex hydrides employed in the invention may be represented by formula (I):

$$M_x(AlH_3)_y H_z \qquad (I)$$

wherein M is a metal; x is an integer of 1 to 3, y is an integer of 1 or 2, and z is equal to x or 2x. Preferred examples of M are Li, Na, Be, Mg and Ca, and preferably x is 1 or 3.

Suitable $AlH_3$-based complex hydrides for use in the invention include $LiAlH_4$, $NaAlH_4$, $Mg(AlH_4)_2$, $Be(AlH_4)_2$, $Zr(AlH_4)_2$, $Ca(AlH_4)_2$, $Li_3AlH_6$ and $Na_3AlH_6$ all of which change their hydrogen sorption properties when mechanically ground or ball milled in the presence of at least one member selected from the following Groups:

1. elements that do not form hydrides in a solid-state form under normal conditions, for example, metalloids such as B, C, Si, P and S, and metals such as Cr, Mn, Fe, Co, Ni, Cu, Mo, Zn, Ga, In and Sn;
2. elements which form relatively stable metal hydrides, such as Be, Mg, Ca, Ti, V, Y, Zr and La;
3. hydrides of the elements from Group 2 above such as $BeH_2$, $MgH_2$, $CaH_2$, $TiH_2$, $VH_2$, $YH_2$, $ZrH_2$ and $LaH_2$;
4. other hydrides based on the $AlH_3$-complex.

These additions, alone or in mixtures, are able to change the sorption properties of the $AlH_3$-based complex hydrides. The mechanism of the change is not fully understood, but it is probable that different mechanisms are involved with the different classes of additive.

The probable mechanisms of altering hydrogenation properties of $AlH_3$ based hydrides are as follows:

i) interstitial alloying of the $AlH_3$-based hydride.

This mechanism is most probable in the case of metalloids as, for example, boron and carbon.

ii) substitutional alloying accompanied by catalysis.

This mechanism is expected to apply to most metal additions from group 2 elements.

iii) synergetic effect of hydrogen sorption in mixtures of hydrides.

This mechanism was found in mixtures of $AlH_3$-based hydrides with hydrides of groups 3 and 4 above and also as a result of ball milling with elements from group 2 above. In the latter case, however, formation of the respective hydrides, listed in group 3, can occur during hydrogenation/dehydrogenation cycling of the main $AlH_3$-based hydride. Depending on the addition, there are essentially two kinds of behaviour of hydride mixtures. One is of a kinetic character, when the basic hydride does not react with the addition. In this case the addition acts as a hydrogen carrier or catalyst and improves the reaction kinetics. The second mechanism is based on formation of new complex hydrides or more complicated hydride complexes. In this case thermodynamic properties of the main $AlH_3$-based hydride are significantly altered, resulting in changed equilibrium pressures for hydride formation.

The above mechanisms for the improvement of hydrogen sorption properties of $AlH_3$-based complex hydrides, as a result of changes in the chemical compositions by means of mechanical alloying with additions, were studied in various $AlH_3$-based complex hydrides with a number of additions from the above groups of materials. Within one family of additions, the amounts of additions were varied.

Typically the molar ratio of the $AlH_3$-based complex hydride to the addition was changed in the range between 10:1 to 1:3. Samples of $AlH_3$-based complex hydrides with no additions at all, but ball milled at the same conditions as the samples with additions, were also studied. As a general conclusion it was found that in each case ball milling alone improved kinetic properties of the $AlH_3$-based complex hydride, but ball milling with additions improved them much more remarkably and evidently could change thermodynamical properties of the main hydride.

Although the detailed nature of these changes has not been fully determined, some general conclusions can be described as follows, in connection with the mechanisms proposed above.

Interstitial character of alloying with metalloids is confirmed by x-ray diffraction analysis. For example, addition of C to $NaAlH_4$ in the molar proportion of 1:1 does not change the x-ray diffraction pattern of $NaAlH_4$ and no other reflections were observed which could indicate formation of other phases. Also, no reflections or halos from crystalline or amorphous carbon can be seen in the x-ray diffraction pattern. At the same time, however, this material exhibits hydrogenation properties which differ dramatically from conventional $NaAlH_4$. As reported previously [1,2] $NaAlH_4$ has such a high equilibrium pressure of hydrogenation that it was normally impossible to rehydrogenate it after decomposition. Only recently Bogdanovic discovered a catalyst that enabled rehydrogenation of $NaAlH_4$ [3, 4]. However, a very high hydrogen pressure of 150 atm was still necessary to perform absorption at 170° C.

A material according to the present invention, being a ball milled mixture of $NaAlH_4$ and C exhibits reversible hydrogen sorption properties at much lower pressures and with much faster kinetics. Equilibrium pressure for this material is, for example, about two times lower at 140° C., than the reported values for conventional $NaAlH_4$ [1, 2]. This means that much lower hydrogen pressures are required to effectively perform hydrogen absorption. Moreover, kinetics of the hydrogenation/-dehydrogenation cycles remarkably exceeds the reaction rates observed not only for the conventional $NaAlH_4$, but also for the catalysed $NaAlH_4$ of the prior art [3, 4]. For example, the catalysed $NaAlH_4$ desorbs 2 wt. % of hydrogen at 160° C. within about 6 hrs. [3, 4], while $NaAlH_4$ with C of the invention can desorb the same amount of hydrogen within only 30 min. For comparison, conventional $NaAlH_4$ without catalyst requires more than 50 hrs. at 160° C. to desorb 2 wt. % of hydrogen.

In another example boron is found to be very effective in changing the hydrogen sorption properties of different $AlH_3$-based complex hydrides. In complex hydrides boron shifts the equilibrium pressure of hydrogen towards lower pressures, i.e., stabilizes the $AlH_3$-based complex hydride. This is very advantageous because as a result these hydrides can effectively operate at lower hydrogen pressures.

Addition of silicon also results in significantly enhanced kinetics of hydrogenation cycling of the $AlH_3$-based complex hydrides.

Additions of metals, for example, Cu, Ni, Fe and Zn also improve sorption properties of $AlH_3$-hydride complexes. The presence of Cu, Fe or Mn can be seen in the x-ray diffraction pattern, but with a clearly reduced size of the metal grains, which is very advantageous from the point of view of the possible catalytic action of the additions.

$AlH_3$-based complex hydrides ball milled with elements which easily form hydrides, from group 2 above, are among the most interesting materials because of the variety of the possible combinations of the hydride mixtures. The additions can be introduced into the mixture in the form of elements or their hydrides, according to groups 2 and 3 above. Ball milling with these additions results in the formation of hydride complexes with changed thermodynamical properties. For example, ball milling of $NaAlH_4$ with zirconium or with its hydride results in such a change of the equilibrium pressure that effective absorption of hydrogen can be performed at 60 to 80 atm instead of 150 atm., as reported previously for catalysed $NaAlH_4$ [3, 4]. Kinetics of hydrogenation cycling are also many times faster at similar temperatures than catalysed $NaAlH_4$. Excellent hydrogen sorption properties appear to be even more enhanced when the mixtures are in the nanocrystalline form, with the components being extremely finely intermixed.

Suitably the AlH$_3$-based complex hydride and the additive from one or more of groups 1, 2, 3 and 4 above, have a particle size below 100 μm, preferably below 50 μm.

The hydrogen storage compositions of the invention liberate hydrogen at a temperature of at least 80° C., generally 80 to 180° C. and typically 100 to 180° C.

Hydrogen absorption into the dehydrogenated form of the hydrogen storage composition of the invention is suitably carried out at a temperature of 80 to 150° C. typically 100 to 150° C., and a hydrogen pressure of 20 to 100, preferably 30 to 80 atm for a period of 0.25 to 5 hours, preferably 0.5 to 3 hours.

The hydrogen storage compositions of the invention have a hydrogen capacity of 2 to 7, more usually 3 to 7 wt. %.

BRIEF DESCRIPTION OF DRAWINGS

FIG. 1 illustrates graphically desorption of hydrogen from a hydrogen storage composition of the invention, based on NaAlH$_4$ and C;

FIG. 2 illustrates graphically hydrogen absorption during regeneration from the dehydrogenated form of the composition of FIG. 1;

EXAMPLES

Example 1

NaAlH$_4$ was ball milled with an addition of C in a high-energy ball mill SPEX 8000 (Trade-mark). The molar ratio of the hydride to C was 3:1. After ball milling the mixture was placed in an automated gas titration system and subjected to hydrogenation/dehydrogenation cycles. The material was able to desorb about 3 wt. % at temperatures as low as 90°–150° C. (FIG. 1), with an additional 1.5 wt. % being released at about 160° C. Rehydrogenation was performed at about 80 atm at a temperature of 130° C. and was completed within 2 to 3 hours (FIG. 2).

Example 2

Figure 3:
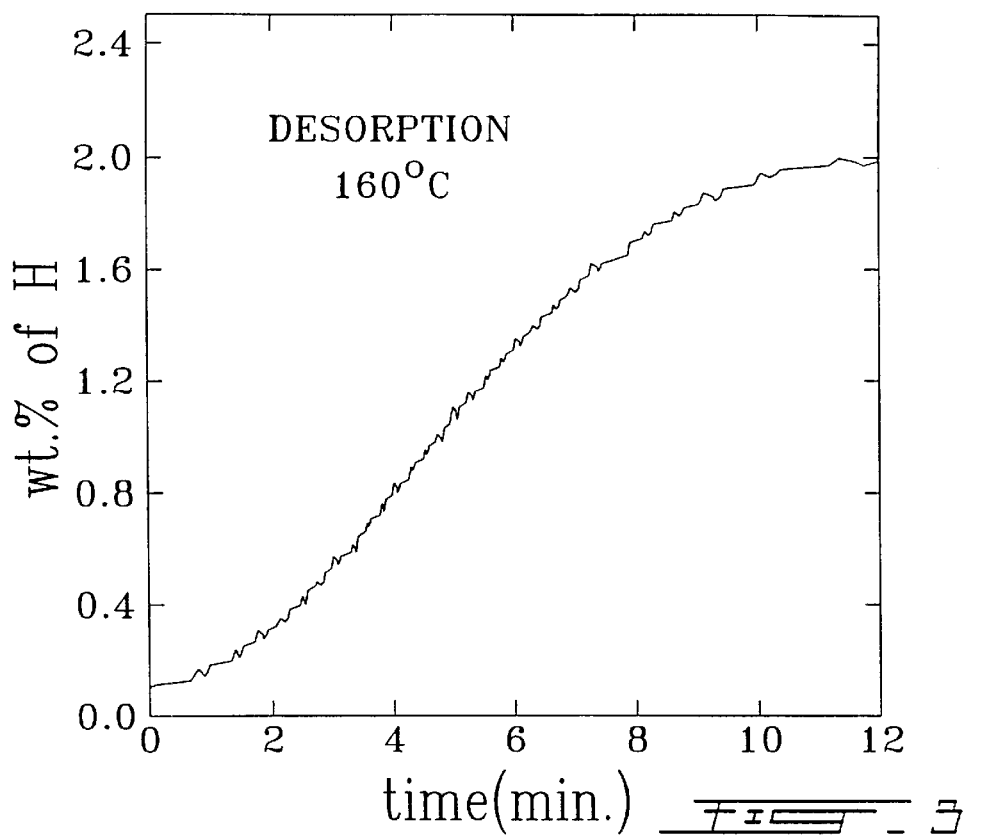
FIG. 3 illustrates graphically hydrogen desorption from a hydrogen storage composition of the invention, based on NaAlH$_4$ and Cu.
Figure 4:
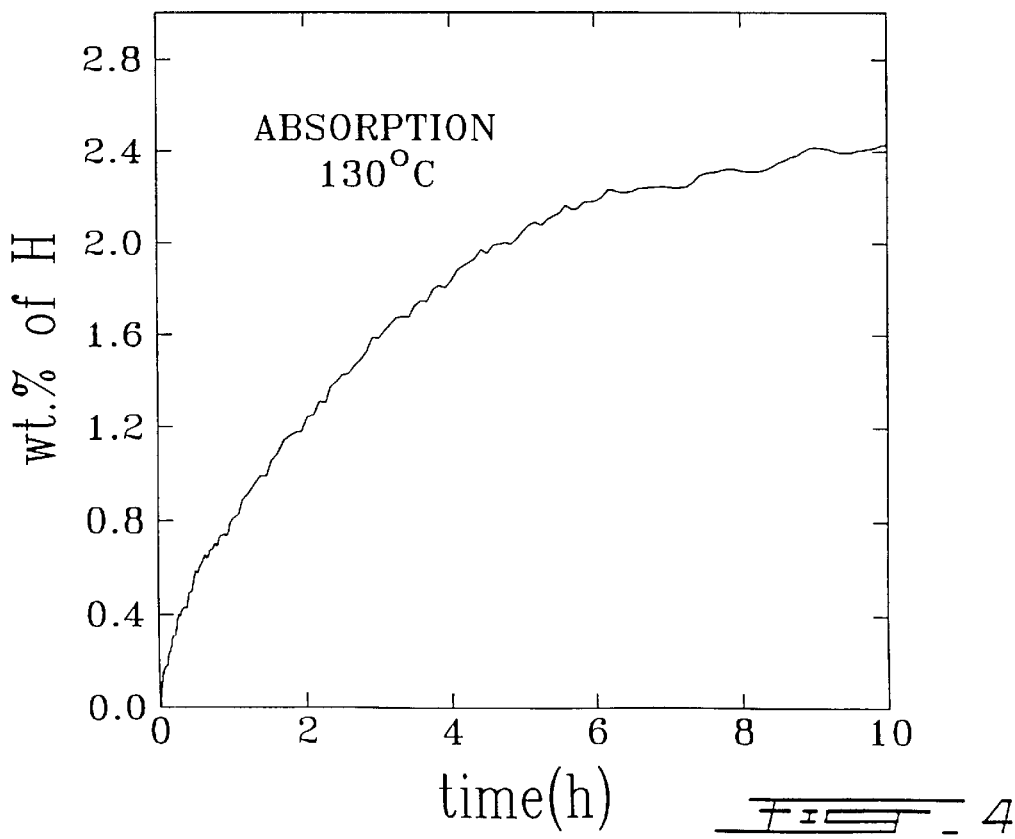
FIG. 4 illustrates graphically hydrogen absorption from a hydrogen storage composition of the invention, based on NaAlH$_4$ and Zn.

NaAlH$_4$ was ball milled in a high-energy ball mill, with additions of metals that normally do not form metal hydrides, i.e. Cu and Zn. In both cases the molar ratio of the hydride to metal was 4:1. The subsequent hydrogenation/dehydrogenation cycles showed efficient desorption and absorption at temperatures and under hydrogen pressure at which conventional NaAlH$_4$ could never operate (FIGS. 3 and 4).

Example 3

Figure 5:
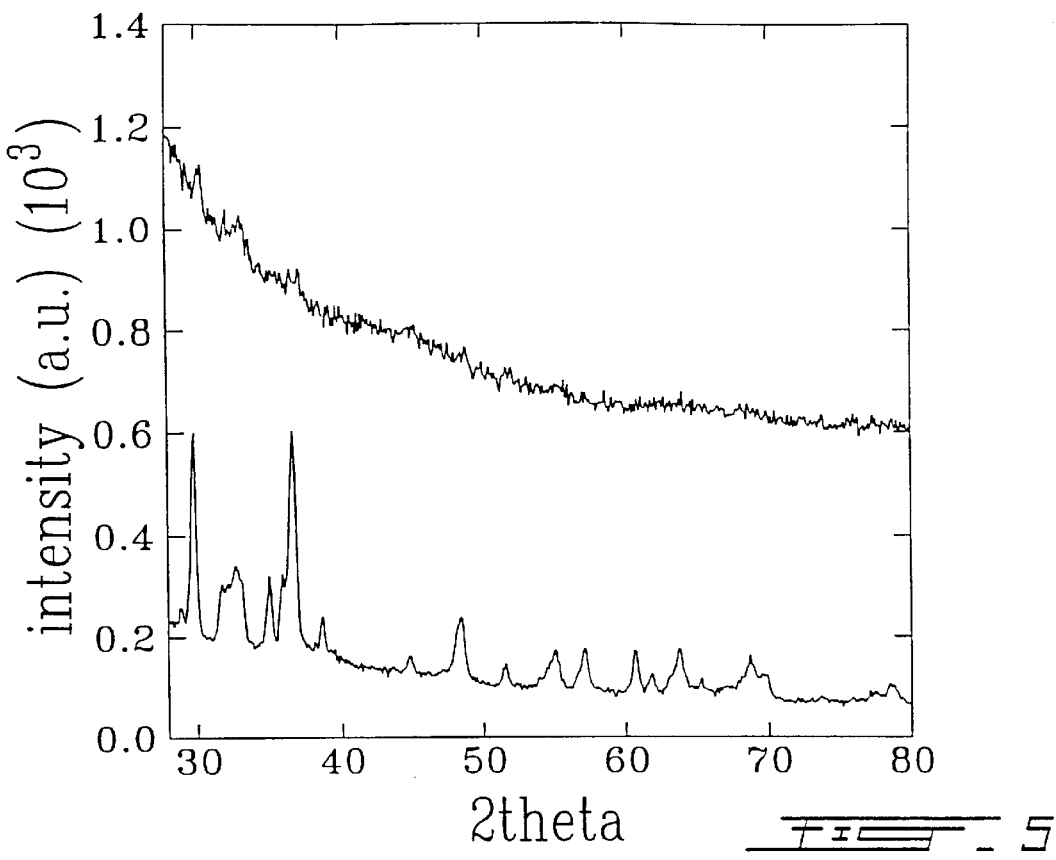
FIG. 5 illustrates the diffraction pattern of a hydrogen storage composition of the invention derived from NaAlH$_4$ and Zr after long (18 h) and short (1 h) milling time.
Figure 6:
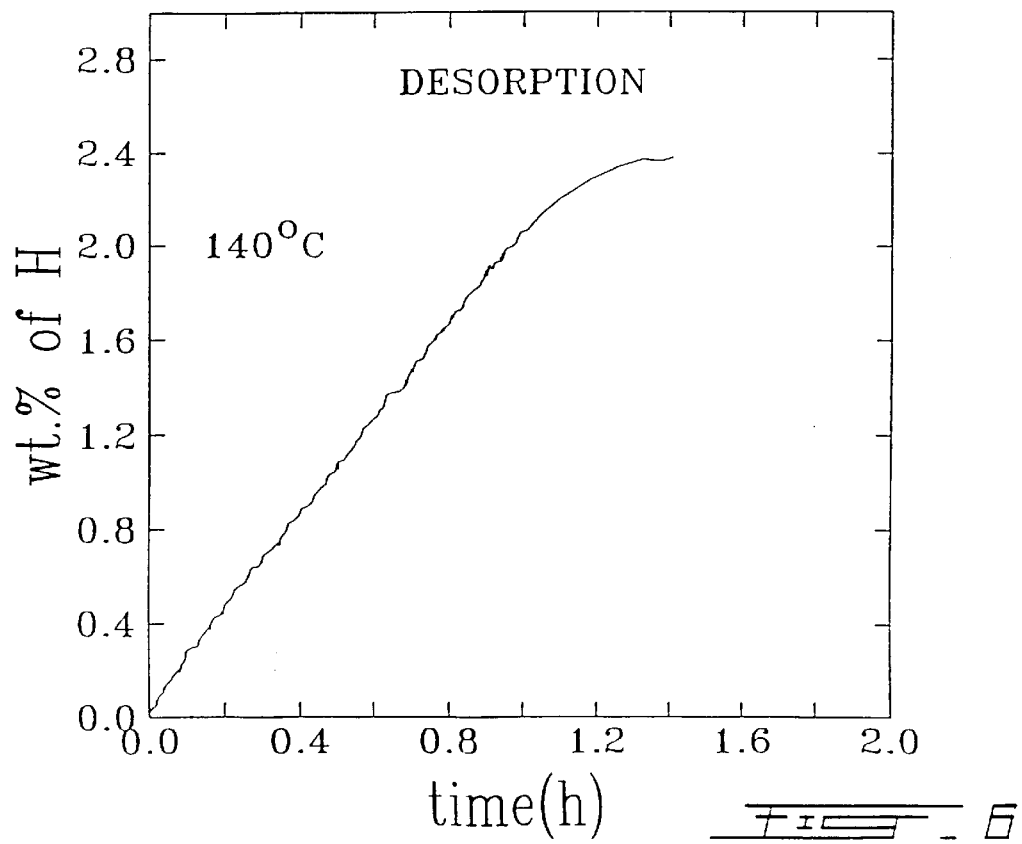
FIG. 6 illustrates graphically desorption of hydrogen from the storage composition of FIG. 5.

NaAlH$_4$ was ball milled with addition of zirconium, added at a molar ratio of 4:1. After ball milling the material exhibited extremely fine microstructure which was seen in the x-ray diffraction pattern, all Bragg's reflections being nearly vanished (FIG. 5). For comparison, x-ray diffraction pattern of another mixture of NaAlH$_4$+Zr (3:1, shorter milling time) is also presented in FIG. 5. As compared to the conventional NaAlH$_4$, this material exhibits outstanding hydrogenation properties with fast hydrogen desorption at temperatures between 110 and 150° C. (FIG. 6) and rehydrogenation at hydrogen pressures of 50–80 atm. Similar hydrogenation performance is obtained when zirconium is introduced in the form of zirconium hydride, ZrH$_2$, instead of Zr.

Example 4

LiAlH$_4$ ball milled with Mg was investigated by differential scanning calorimetry (DSC, Perkin-Elmer). Comparison of the DSC traces for the hydrogen evolution showed that the sample containing magnesium desorbed hydrogen at higher temperatures than the sample without additions. This means that stability of the hydride with magnesium was increased, leading to lower hydrogen pressures required for rehydrogenation. The same was confirmed by desorption measurements in the gas titration system. Similar increase of the stability of LiAlH$_4$ can be also obtained after ball milling with magnesium hydride instead of magnesium.

Example 5

Figure 7:
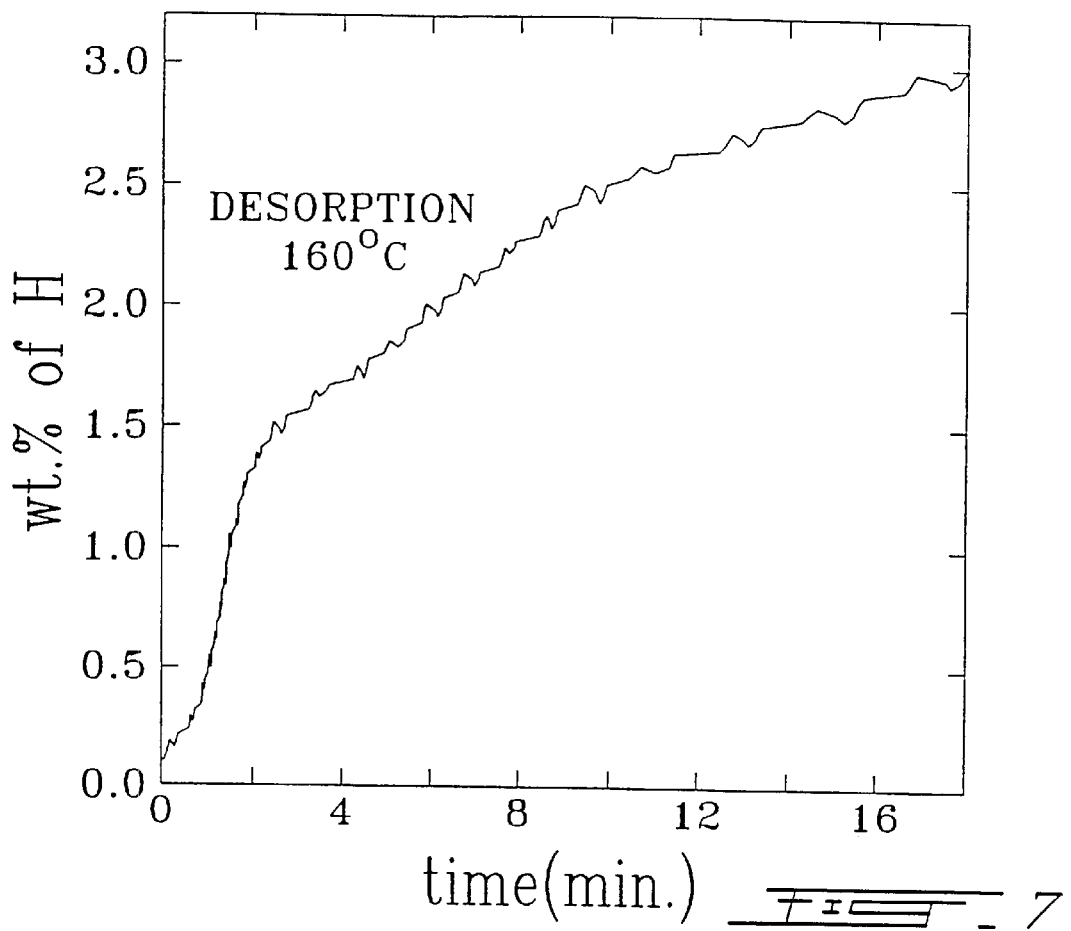
FIG. 7 illustrates graphically hydrogen desorption from a hydrogen storage composition of the invention, based on NaAlH$_4$ and LiAlH$_4$.

A mixture of two hydrides: NaAlH$_4$ and LiAlH$_4$ in a molar ratio of 1:1, was ball milled in a high energy ball mill (SPEX 8000). As a result, the mixture exhibited great improvement in the desorption kinetics (FIG. 7), as compared to the conventional desorption of NaAlH$_4$ and LiAlH$_4$.

References

[1] T. N. Dymova, N. G. Eliseeva, S. Bakum and Y. M. Dergachey *Dolk, Akad. Nauk SSSR*, Vol. 215, p. 1369, 1974.

[2] T. N. Dymova, Y. M. Dergachev, V. A. Sokolov and N. A. Grechanaya *Dolk, Akad. Nauk SSSR*, Vol. 224, No. 3, p. 591, 1975.

[3] B. Bogdanovic and M. Schwickardi, *J. Alloys and Comp.*, Vol. 253, p. 1, 1997.

[4] B. Bogdanovic, *German Pat. Appln. No.* 195 26 434.7, 1995.

We claim:

1. A reversible hydrogen storage composition having a hydrogen capacity exceeding 2 wt. % and capable of reversible operation at temperatures of 80–180° C. comprising
   i) an unstable AlH$_3$-based complex hydride alloyed by ball milling with:
   ii) at least one member selected from the group consisting of:
      a) an element that does not readily form a hydride in a solid-state form,
      b) an elemental metal which forms a stable metal hydride, said elemental metal being selected from the group consisting of Be, Mg, Ca, Ti, V, Y, Zr and La, and
      c) a hydride of said elemental metal of b),
      said unstable AlH$_3$-based complex hydride i) liberating hydrogen readily at temperatures of 100 to 150° C.

2. A composition according to claim 1, wherein said member is a said element a) being a metalloid selected from B, C, Si, P and S.

3. A composition according in claim 1, wherein said member is a said element a) being a metal selected from Cr, Mn, Fe, Co, Ni, Cu, Mo, Zn, Ga, In and Sn.

4. A composition according to claim 1, wherein the AlH$_3$-based complex hydride i) is of formula (I):

$$M_x(AlH_3)_yH_z \quad (I)$$

wherein
M is a metal,
x is an integer of 1 to 3,
y is an integer of 1 or 2, and
z is equal to x or 2x.

5. A composition according to claim 4, wherein M is selected from Li, Na, Be, Mg and Ca and x is 1 or 3.

6. A composition according to claim 5, having a molar ratio of said hydride to said member of 10:1 to 1:3.

7. A composition according to claim 4, having a molar ratio of said hydride to staid member of 10:1 to 1:3.

8. A composition according to claim 1, wherein said unstable AlH$_3$-based complex hydride i) is selected from LiAlH$_4$, NaAlH$_4$, Mg(AlH$_4$)$_2$, Be(AlH$_4$)$_2$, Zr(AlH$_4$)$_2$, Ca(AlH$_4$)$_2$, Li$_3$AlH$_6$ and Na$_3$AlH$_6$.

9. A composition according to claim 8, having a molar ratio of said hydride to said member of 10:1 to 1:3.

10. A composition according to claim 8, wherein said member is alloyed with said hydride ball milling to a particle size below 100 μm.

11. A composition according to claim 1, having a molar ratio of said hydride to said member of 10:1 to 1:3.

12. A composition according to claim 1, wherein said member is alloyed with said hydride by ball milling to a particle size below 100 μm.

13. A composition according to claim 1, which liberates hydrogen at a temperature above 80° C. to produce a material which is a dehydrogenated state of said composition, said material being adapted to absorb hydrogen to regenerate said hydrogen storage composition.

14. A composition of claim 13, in said dehydrogenated state.

15. A composition according to claim 1, wherein said member is a said elemental metal b).

16. A method of supplying hydrogen comprising liberating hydrogen from a reversible hydrogen storage composition having a hydrogen capacity exceeding 2 wt % and capable of reversible operation at temperatures of 80–180° C. comprising
  i) an unstable AlH$_3$-based complex hydride alloyed by ball milling with:
  ii) at least one member selected from the group consisting of:
   a) an element that does not readily form a hydride in a solid-state form,
   b) an elemental metal which forms a stable metal hydride, said elemental metal being selected from the group consisting of Be, Mg, Ca, Ti, V, Y, Zr and La, and
   c) a hydride of said elemental metal of b),
   said unstable AlH$_3$-based complex hydride i) liberating hydrogen readily at temperatures of 100 to 150° C.,
  at a temperature of at least 80° C. with formation of a dehydrogenated form of said composition,
  removing said liberated hydrogen, and
  absorbing hydrogen in said dehydrogenated form to regenerate said composition as a future source of hydrogen.

17. A method according to claim 16, wherein said temperature is 80 to 180° C.

18. A method according to claim 16, wherein said absorbing of hydrogen is carried out at a temperature of 80 to 150° C. and a hydrogen pressure of 10 to 100 atmospheres.

* * * * *